(12) United States Patent
Ikenoya et al.

(10) Patent No.: US 10,697,206 B2
(45) Date of Patent: Jun. 30, 2020

(54) OPERATION HANDLE AND HANDLE MAIN BODY STRUCTURE FOR OPERATION HANDLE

(71) Applicant: ALPHA CORPORATION, Yokohama-shi, Kanagawa (JP)

(72) Inventors: Kazuto Ikenoya, Yokohama (JP); Koji Soya, Tatebayashi (JP)

(73) Assignee: ALPHA CORPORATION, Yokohama-shi, Kanagawa (JP)

(*) Notice: Subject to any disclaimer, the term of this patent is extended or adjusted under 35 U.S.C. 154(b) by 408 days.

(21) Appl. No.: 15/692,104

(22) Filed: Aug. 31, 2017

(65) Prior Publication Data
US 2017/0362859 A1 Dec. 21, 2017

Related U.S. Application Data

(63) Continuation of application No. PCT/JP2016/056644, filed on Mar. 3, 2016.

(30) Foreign Application Priority Data

Mar. 3, 2015 (JP) .................................. 2015-041211

(51) Int. Cl.
E05B 79/06 (2014.01)
E05F 11/38 (2006.01)
(Continued)

(52) U.S. Cl.
CPC .............. *E05B 79/06* (2013.01); *E05B 85/12* (2013.01); *E05F 11/38* (2013.01); *F16B 21/18* (2013.01); *F16B 21/186* (2013.01); *F16D 1/116* (2013.01)

(58) Field of Classification Search
CPC .......... E05B 79/06; E05B 85/12; E05F 11/38; F16B 21/18; F16B 21/186; F16D 1/116
(Continued)

(56) References Cited

U.S. PATENT DOCUMENTS

| 1 A | * | 7/1836 | Ruggles | .................. | B61C 11/04 |
| | | | | | 295/4 |
| 3,471,186 A | * | 10/1969 | Geen | ......................... | F16B 9/02 |
| | | | | | 269/47 |

(Continued)

FOREIGN PATENT DOCUMENTS

| CN | U-202948652 | 5/2013 |
| CN | A-104988702 | 10/2015 |

(Continued)

OTHER PUBLICATIONS

Extended European Search Report dated Oct. 1, 2018 in corresponding Eurpopean patent application 16759011.6 (9 pages).

(Continued)

*Primary Examiner* — Nathan Cumar
(74) *Attorney, Agent, or Firm* — Faegre Drinker Biddle & Reath LLP

(57) ABSTRACT

An operation handle which is linked to a shaft body and which is configured to operate the shaft body, the operation handle includes a handle main body, and a linking clip. The handle main body includes a cylindrical shape shaft body retaining portion fitted over the shaft body. The shaft body retaining portion includes a pair of clip-holding grooves. The linking clip includes a base portion and a pair of elastic legs which face each other via the base portion. Each of the pair of elastic legs includes a locking portion. The pair of elastic legs are inserted into the pair of the clip-holding grooves and the shaft body retaining portion is interposed from both sides by the pair of elastic legs and the linking clip is mounted in the shaft body retaining portion.

5 Claims, 5 Drawing Sheets

(51) Int. Cl.
*E05B 85/12* (2014.01)
*F16B 21/18* (2006.01)
*F16D 1/116* (2006.01)

(58) Field of Classification Search
USPC .................................................... 292/336.3
See application file for complete search history.

(56) References Cited

U.S. PATENT DOCUMENTS

| | | | | | |
|---|---|---|---|---|---|
| 3,477,309 | A | * | 11/1969 | Sprecher | ................ G05G 1/085 |
| | | | | | 292/353 |
| H10 | H | * | 1/1986 | Frank | ............................ 220/200 |
| 5,131,785 | A | | 7/1992 | Shimazaki | |
| 5,518,332 | A | * | 5/1996 | Katoh | ..................... F16B 21/16 |
| | | | | | 285/305 |

FOREIGN PATENT DOCUMENTS

| | | |
|---|---|---|
| DE | A1-19912729 | 9/2000 |
| EP | A1-2952817 | 12/2015 |
| JP | H04-20135 Y2 | 5/1992 |
| JP | A-H10-274222 | 10/1998 |
| JP | A-2004-298498 | 10/2004 |
| JP | 2006-322518 A | 11/2006 |
| JP | 4352742 B2 | 10/2009 |

OTHER PUBLICATIONS

International Search Report dated Jun. 7, 2016 for PCT/JP2016/056644 [English translation].
International Search Report/Written Opinion dated Jun. 7, 2016 for PCT/JP2016/056644 [non-English language].
CN Office Action dated Dec. 5, 2018 in Chinese Application No. 201680013387.1 (with attached English-language translation).

* cited by examiner

OPERATION HANDLE AND HANDLE MAIN BODY STRUCTURE FOR OPERATION HANDLE

CROSS REFERENCE TO RELATED APPLICATIONS

This application is a continuation of PCT application No. PCT/JP2016/056644, which was filed on Mar. 3, 2016 based on Japanese Patent Application (No. 2015-041211) filed on Mar. 3, 2015, the contents of which are incorporated herein by reference.

BACKGROUND OF THE INVENTION

Field of the Invention

The present disclosure relates to an operation handle and a handle main body structure therefor.

Description of Related Art

A vehicle provided with a sliding door is known in the related art. In the vehicle, an inside handle that is an operation handle is provided at a required position of a door inner panel. The sliding door slides to the rear and the sliding door is opened by rotating the operation handle so as to be pulled to the rear. Alternatively, the sliding door slides to the front and the sliding door is closed by rotating the operation handle so as to be pushed out to the front.

The operation handle is configured by a handle main body and a linking clip with a substantial U-shape, and is linked to a shaft body that is exposed to the indoor side by a trim material of the front surface on the indoor side. Specifically, a cylindrical shape shaft body retaining portion that is fitted over the shaft body is formed on the handle main body, and a pair of clip-holding grooves are formed on the outer peripheral surface of the shaft body retaining portion. The linking clip interposes the shaft body retaining portion from both sides when inserted into the clip-holding groove, and thereby, is mounted in the shaft body retaining portion. In addition, the linking clip is formed by bending so as to enter inside the shaft body retaining portion, and locks a locking portion of the shaft body that is inserted into the shaft body retaining portion. Thereby, it is possible to regulate the handle main body being pulled out from the shaft body.

Note that, in such a locking structure, looseness is generated in the linking clip in the gap of the clip-holding groove. In this case, when the shaft body moves due to vibration of the vehicle, the linking clip also moves and an abnormal sound is generated due to interference by the linking clip and the clip-holding groove.

For example, Patent Document 1 (JP-A-2006-322518) discloses a snap ring as the linking clip. Specifically, a groove portion on the side surface of the shaft is formed on the tip end portion of a drive shaft. The snap ring fulfills the role of being attached to the groove portion and preventing pulling out from a differential mechanism of the drive shaft. The snap ring has a C-shape, and has a shape in which deformation in a torsional direction is applied and one tip end portion and another tip end portion deviate in the axial direction of the link.

In the snap ring accompanying such torsional deformation, it is possible for biasing force (spring force) that presses the side surface of the groove portion in the axial direction of the shaft to be generated. As a result, even in a case where deviation force acts on the snap ring in a radial direction of the drive shaft, it is possible to hold a state in which the shaft center of the drive shaft and the center of the snap ring are aligned.

According to a related art, since the linking clip is deformed in advance in a snap ring, it is necessary to perform positional alignment well such that the linking clip and the clip-holding groove do not interfere with each other when inserting into the clip-holding groove. Therefore, in assembly work of the linking clip, it is difficult to automatically use a manufacturing apparatus without performing manual work required for fine adjustment. Thereby, there is a problem in that in addition to assembly costs, it is not possible to obtain high productivity.

[Patent Document 1] JP-A-2006-322518

SUMMARY

One or more embodiments provide an operation handle and a handle main body structure which is superior in assembly work of the linking clip.

Solution to Problem

In accordance with one or more embodiments, an operation handle is linked to a shaft body and is configured to operate the shaft body. The operation handle includes a handle main body including a cylindrical shape shaft body and a linking clip. The handle main body includes a cylindrical shape shaft body retaining portion fitted over the shaft body the shaft body retaining portion includes a pair of clip-holding grooves. The linking clip includes a base portion and a pair of elastic legs which face each other via the base portion. Each of the pair of elastic legs includes a locking portion. The pair of elastic legs are inserted into the pair of the clip-holding grooves and the shaft body retaining portion is interposed from both sides by the pair of elastic legs and the linking clip is mounted in the shaft body retaining portion. Each of the locking portions extends further inside than an inner peripheral wall of the shaft body retaining portion. At least one of the pair of the clip-holding grooves includes a shape deforming portion which has a groove shape deformed from an insertion direction of the linking clip and which elastically deforms the elastic legs inserted into the clip-holding grooves along the groove shape.

In one or more embodiments, one of the pair of the clip-holding grooves may include a straight region which is formed in a straight line shape based on the insertion direction of the linking clip and an inclined region which is continuous to the straight region and is inclined relative to the straight region.

In one or more embodiments, in one of the pair of the clip-holding grooves, the straight region may be provided on the front side in the insertion direction of the linking clip, and the inclined region is provided on the back side in the insertion direction of the linking clip.

In one or more embodiments, the shape deforming portion may be provided on the one clip-holding groove out of the pair of the clip-holding grooves, and the other clip-holding groove out of the pair of the clip-holding grooves may be formed in a straight line shape in which a groove shape is uniform according to the insertion direction of the linking clip.

In accordance with one or more embodiments, a handle main body structure of an operation handle which is linked to a shaft body via a linking clip which includes a pair of elastic legs which face each other via a base portion, the handle main body structure includes a main body portion and a cylindrical shape shaft body retaining portion fitted over the shaft body. The shaft body retaining portion has a pair of clip-holding grooves formed on the outer peripheral surface of the shaft body retaining portion. When the pair of elastic legs are inserted into the pair of the clip-holding grooves, the shaft body retaining portion is configured that the shaft body retaining portion is interposed from both sides by the pair of elastic legs and that the linking clip is mounted in the shaft body retaining portion. The shaft body retaining portion is configured that a locking portion of the pair of elastic legs extends further inside than an inner peripheral wall of the shaft body retaining portion. At least one of the pair of the clip-holding grooves includes a shape deforming portion which deforms the groove shape according to an insertion direction of the linking clip and elastically deforms the elastic legs inserted into the clip-holding groove along the groove shape.

According to one or more embodiments, looseness of a linking clip is suppressed since it is possible to increase abutting force of the linking clip and a clip-holding groove of a shaft body retaining portion. As a result, it is possible to effectively suppress deviation in an axial direction of a handle main body. In addition, since it is not necessary to use the linking clip for which a shape is deformed in advance, it is possible to easily insert the linking clip into the clip-holding groove and it is possible to automate assembly work of the linking clip. Thereby, it is possible to provide an operation handle that is superior in assembly work of the linking clip.

DESCRIPTION OF EMBODIMENTS

Embodiments will be described below with reference to the drawings. Note that, the drawings and the following disclosure exemplify the present disclosure, and thereby, the present disclosure is not intended to be limited to a subject described in the scope of the claims.

Figure 1A:
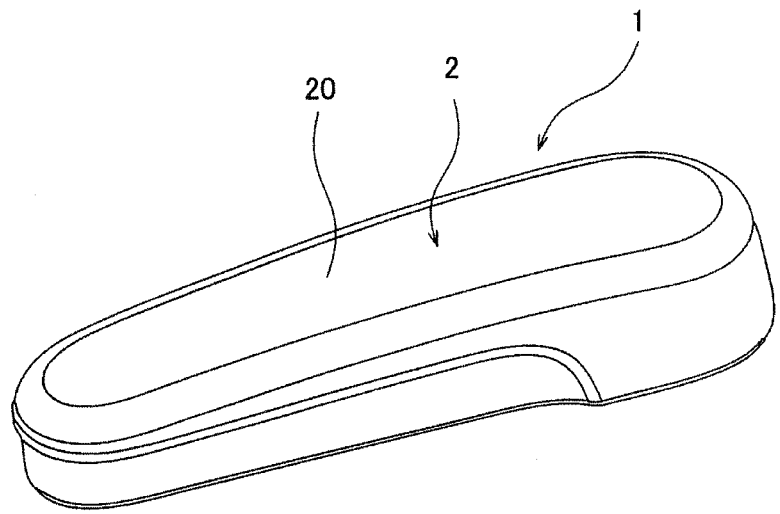
FIG. 1A is a perspective view illustrating an operation handle from a horizontal plane side.
Figure 1B:
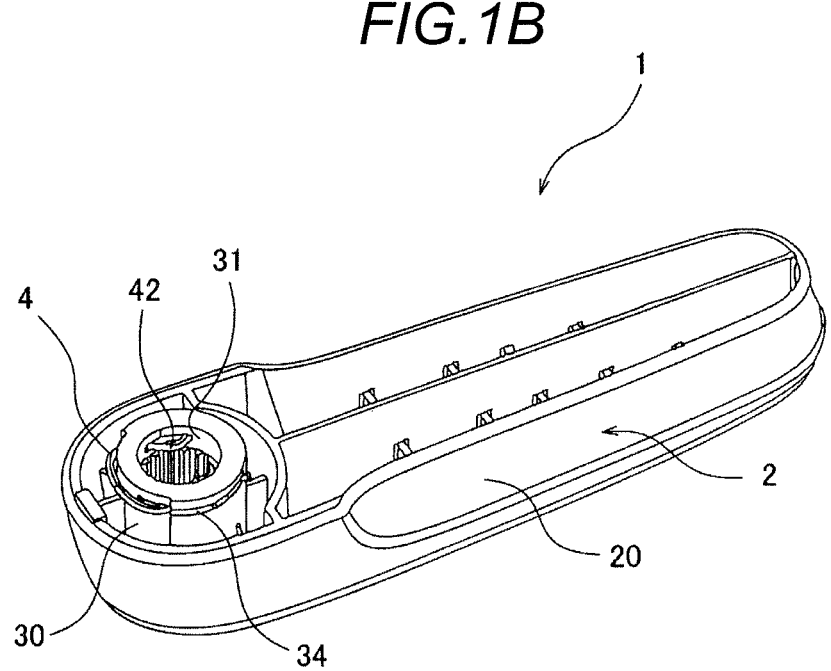
FIG. 1B is a perspective view illustrating the operation handle from a bottom surface side.

FIG. 1A and FIG. 1B are perspective views illustrating an operation handle 1 according to the present embodiment. FIG. 1A is a diagram illustrating the operation handle 1 from a horizontal plane side, and FIG. 1B is an explanatory diagram illustrating the operation handle 1 from a bottom surface side. The operation handle 1 is a handle for operating the shaft body by linking with the shaft body, and for example, is an inside handle that is disposed on the indoor side for performing opening and closing of the vehicle sliding door.

The operation handle 1 has a handle main body 2 and a linking clip 4, and the operation handle 1 is constituted by mounting the linking clip 4 in the handle main body 2.

Figure 2A:
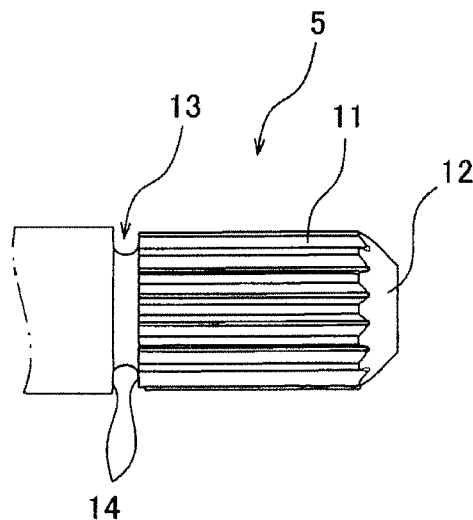
FIG. 2A and FIG. 2B are explanatory diagrams illustrating a shaft body.
Figure 2B:
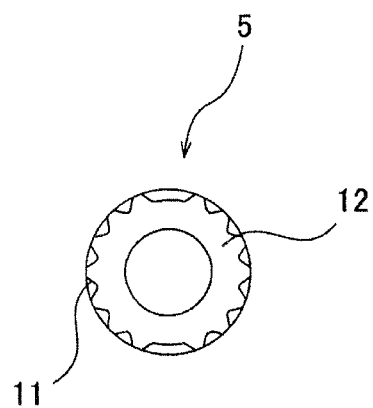

FIG. 2A and FIG. 2B are explanatory diagrams illustrating a shaft body 5. A flexible trim material (not shown in the drawings) is disposed on the indoor side front surface of the sliding door, and the shaft body 5, which is provided in a door main body inner portion, is exposed by the tip end portion thereof to the indoor side using the trim material. The operation handle 1 is linked to the shaft body 5 and is operated by an occupant.

A serrated portion 11 in which the outer peripheral surface is serrated is provided on the tip end portion of the shaft body 5. A tapered portion 12 that is tapered is provided on the tipmost end of the shaft body 5. A clip fitting groove 13 that is formed in a concave shape along a circumferential direction is provided in a base end portion of the serrated portion 11, and an outer diameter of the shaft body 5 is formed in a shape that reduces in a step shape in the base end portion of the serrated portion 11. Depending on the shape of the different steps, a clip locking portion 14 is formed to lock the linking clip 4.

Figure 3:
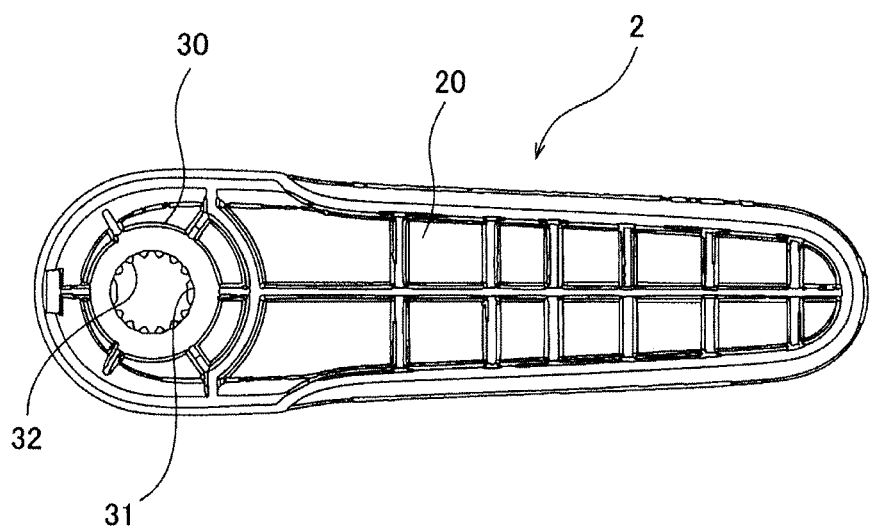
FIG. 3 is a bottom surface view of a handle main body.
Figure 4:
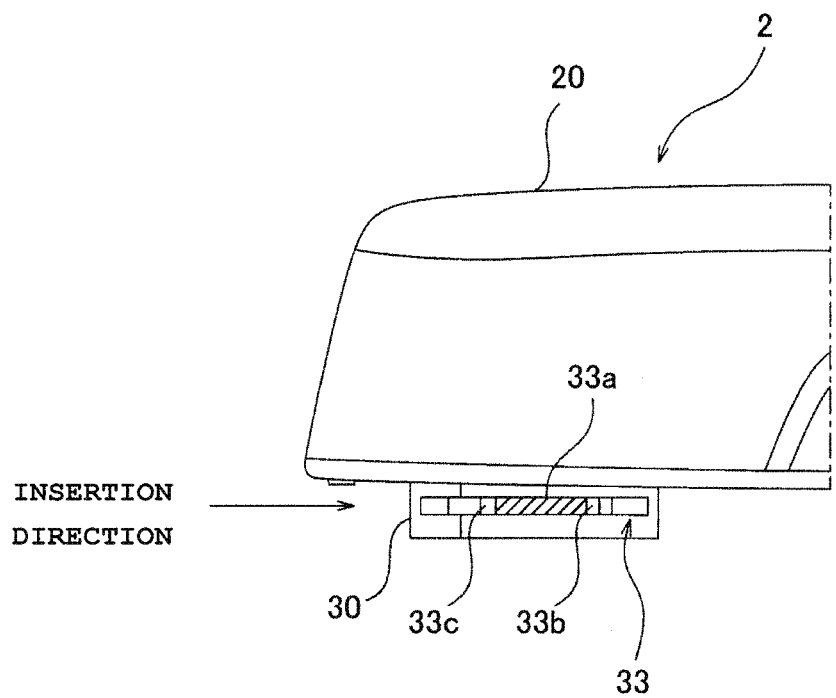
FIG. 4 is a right side surface view with the main portions of the handle main body enlarged.
Figure 5:
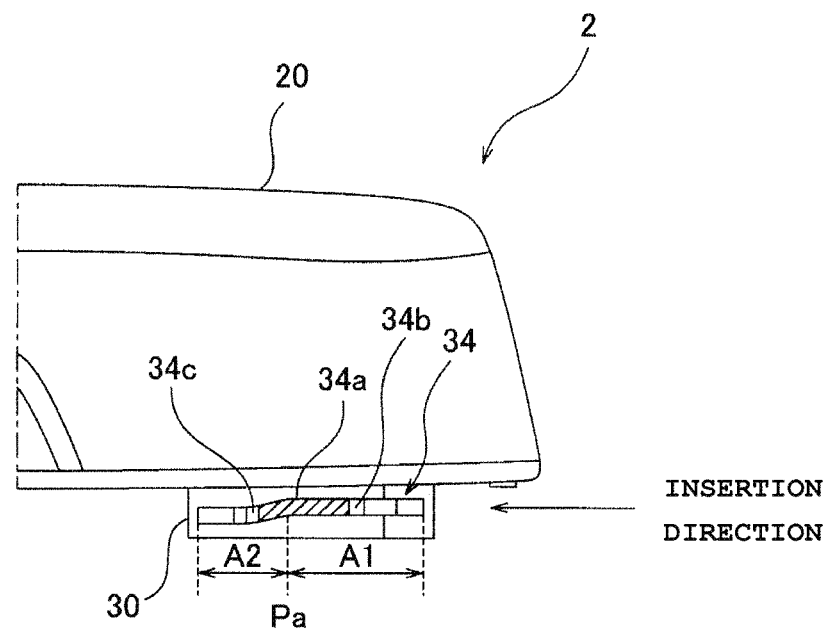
FIG. 5 is a left side surface view with the main portions of the handle main body enlarged.

FIG. 3 is a bottom surface view of the handle main body 2, FIG. 4 is a right side surface view illustrating the main portions of the handle main body 2 enlarged, and FIG. 5 is a left side surface view illustrating the main portions of the handle main body 2 enlarged. The handle main body 2 is fitted over the shaft body 5 and is a handle when a sliding door is open and closed.

The handle main body 2 is constituted by a main body portion 20 that is the main part of the handle main body 2 and a shaft body retaining portion 30 into which the shaft body 5 is inserted. For example, the handle main body 2 is formed in a required shape by injection molding a synthetic resin material.

The shaft body retaining portion 30 is positioned in the end portion of the main body portion 20. The shaft body retaining portion 30 is formed in a cylindrical shape, and is erected on the bottom surface side of the main body portion 20 such that the tip end portion of the shaft body retaining portion 30 protrudes more than the main body portion 20. A serrated groove 32 that corresponds to the serrated portion 11 of the shaft body 5 is formed on an inner peripheral wall 31 of the shaft body retaining portion 30. The shaft body 5 and the shaft body retaining portion 30 are fitted by inserting the shaft body 5 into the shaft body retaining portion 30. At this time, idling of the handle main body 2 is regulated when mounted in the shaft body 5 that is a rotating shaft by meshing the serrated portion 11 of the shaft body 5 with the serrated groove 32 of the inner peripheral wall 31.

A pair of clip-holding grooves 33 and 34 that are constituted from a first clip-holding groove 33 and a second clip-holding groove 34 for inserting and mounting the linking clip 4 are formed on the outer peripheral surface of the shaft body retaining portion 30. The pair of the clip-holding grooves 33 and 34 are each formed along the longitudinal direction of the handle main body 2 at a position that interposes and faces the center position of the shaft body retaining portion 30. In the handle main body 2 according to the present embodiment, the linking clip 4 is inserted along the longitudinal direction of the handle main body 2 from the end portion side of the main body portion 20 in which the shaft body retaining portion 30 is positioned.

The first clip-holding groove 33 is formed in a straight line shape referencing the insertion direction of the linking clip 4. As indicated by hatching in the drawings, a through hole portion 33a that passes into an inner peripheral wall 31 is formed in a center portion of the first clip-holding groove 33. Both sides of the through hole portion 33a are formed of opening locking portions 33b and 33c that are locked by the linking clip 4.

The second clip-holding groove 34 is formed in an approximate L-shape in which a bending point Pa is bent on a boundary. Specifically, the second clip-holding groove 34 is constituted by a straight region A1 that is formed in a straight line shape referencing the insertion direction of the linking clip 4 and an inclined region A2 that is linked to the straight region A1 and inclined according to the straight region A1. The straight region A1 is defined as a region from the front side up to the bending point Pa in the insertion direction, and the inclined region A2 is defined as a region from the bending point Pa to the back side in the insertion direction.

Note that, in the operation handle and the handle main body structure therefor of the present disclosure, the inclination of the inclined region A2 is changed to two steps. The wall thickness of a top portion of the shaft body retaining portion 30 becoming thin is avoided by the inclination of the inclined region A2 being uniform. Accordingly, it is also possible to uniformly form the inclination of the inclined region A2 using the shape of the shaft body retaining portion 30.

A through hole portion 34a that passes into an inner peripheral wall 31 is formed in a center portion of the second clip-holding groove 34 in the same manner as the first clip-holding groove 33. Both sides of the through hole portion 34a are formed of opening locking portions 34b and 34c that are locked by the linking clip 4.

Figure 6A:
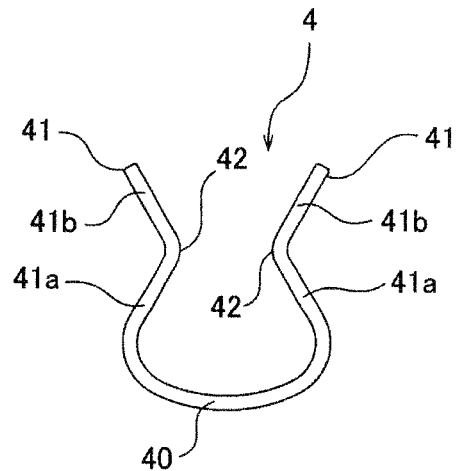
FIG. 6A is a planar view of the linking clip.
Figure 6B:
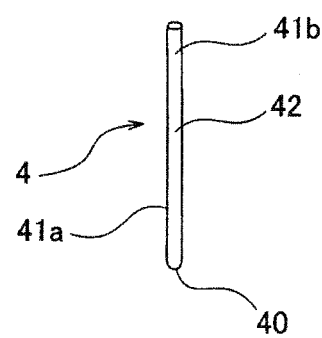
FIG. 6B is a side surface view of the linking clip.
Figure 6C:
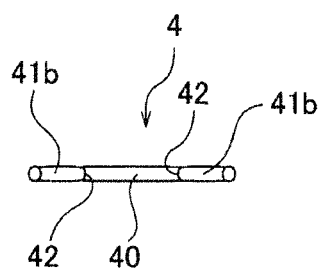
FIG. 6C is a front surface view of the linking clip.

The linking clip 4 is a linking tool for fixing the shaft body 5 and the handle main body 2 and prevents the handle main body 2 from coming off the shaft body 5 by mounting in the handle main body 2 (the pair of the clip-holding grooves 33 and 34). Here, FIG. 6A is a planar view of the linking clip 4, FIG. 6B is a side surface view of the linking clip 4, and FIG. 6C is a front surface view of the linking clip 4.

The linking clip 4 has an approximate U-shape, and the tip ends are formed in a shape of being open to each other in opposite directions. The linking clip 4 is formed by bending a wire that has elasticity such as piano wire.

Specifically, the linking clip 4 is constituted by the base portion 40 that is formed to be gently curved and a pair of elastic legs 41 that extend from both sides of the base portion 40.

One of the elastic legs 41 is formed in a bent shape in an approximate L-shape toward the other elastic leg 41, and is constituted by the first inclination portion 41a that is positioned in the base portion 40 side and a second inclination portion 41b that is positioned in the tip end portion side. In the first inclination portion 41a, a gap between each of the elastic legs 41 becomes narrower as the elastic legs 41 further separates from the base portion 40, and in addition, in the second inclination portion 41b, a gap between each of the elastic legs 41 becomes wider the further separated from the base portion 40.

In each of the elastic legs 41, a bending position that is the boundary of each inclination portion 41a functions as the locking portion 42 for locking the shaft body 5. That is, the locking portion 42 protrudes inside the inner peripheral wall 31 of the shaft body retaining portion 30 and locks the clip locking portion 14 of the shaft body 5 that is inserted into the shaft body retaining portion 30 using the bent shape of the elastic legs 41.

Note that, the locking portion 42 may be formed on both of the two elastic legs 41 by bending each of the two elastic legs 41, and only one elastic leg 41 may be bent and only one elastic leg 41 may be formed.

The operation handle 1 with such a configuration is used by linking to the shaft body 5. In the linking of the operation handle 1 to the shaft body 5, first, the linking clip 4 is mounted in the handle main body 2 and after that, the handle main body 2 is fitted over the shaft body 5.

Figure 7:
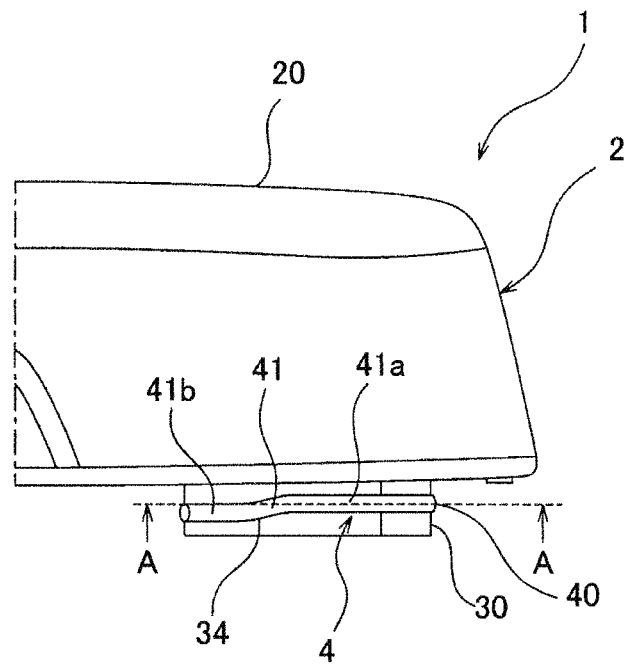
FIG. 7 is a left side surface view with the main portions of the operation handle enlarged.
Figure 8:
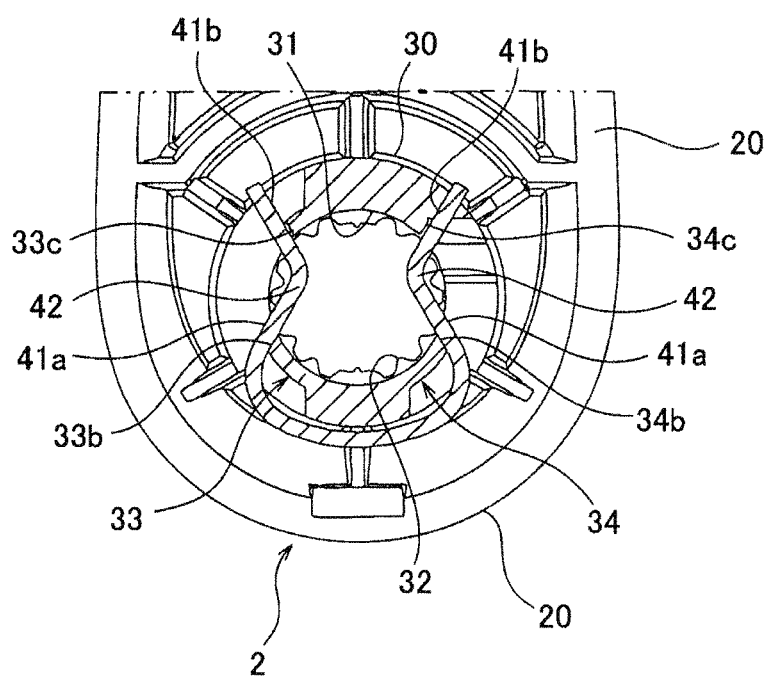
FIG. 8 is a sectional view showing AA cross section of the operation handle shown in FIG. 7.

Firstly, a mounting method of the linking clip 4 in the handle main body 2 will be described. FIG. 7 is a left side surface view with the main portions of the operation handle 1 enlarged, and FIG. 8 is a sectional view showing AA cross section of the operation handle 1 shown in FIG. 7.

First, the linking clip 4 is inserted into the pair of the clip-holding grooves 33 and 34 from the tip end side to which the linking clip 4 is open such that the pair of the clip-holding grooves 33 and 34 of the shaft body retaining portion 30 are interposed from both sides. Resistance from the pair of the clip-holding grooves 33 and 34 acts on the second inclination portion 41b in accordance with the pair of elastic legs 41 entering the pair of the clip-holding grooves 33 and 34, and the pair of elastic legs 41 are elastically deformed to the outside. When the locking portion 42 enters continuously the pair of the clip-holding grooves 33 and 34 in the second inclination portion 41b, resistance from the pair of the clip-holding grooves 33 and 34 acts on the locking portion 42, and the pair of elastic legs 41 are inserted with a fixed deformation state maintained without change.

When insertion of the linking clip 4 is continued, the locking portion 42 reaches the through hole portions 33a and 34a of the pair of the clip-holding grooves 33 and 34. When the locking portion 42 reaches the through hole portions 33a and 34a, the locking portion 42 enters inside the through hole portions 33a and 34a by elastic deformation acting in a direction of return to the original shape. Then, the first inclination portion 41a of the elastic leg 41 slides along the opening locking portions 33b and 34b on the base portion side of the pair of the clip-holding grooves 33 and 34, and the pair of elastic legs 41 are elastically deformed to the inside.

Meanwhile, in the second clip-holding groove 34, the elastic leg 41 is elastically deformed along the bent shape by the second inclination portion 41b that is positioned on the tip end side of the elastic leg 41 passing through the bending point Pa and entering the inclined region A2. Abutting force of the second clip-holding groove 34 and the elastic leg 41 is increased since force in the direction of return to the original shape acts on the elastically deformed elastic leg 41.

When insertion of the linking clip 4 continues against the increase of the abutting force, the second inclination portion 41b of the pair of elastic legs 41 abuts against the opening locking portion 34c on the tip end side of the pair of the clip-holding grooves 33 and 34. Thereby, movement in the insertion direction of the linking clip 4 is regulated and insertion of the linking clip 4 is complete.

Secondly, a method for fitting the handle main body 2 over the shaft body 5 will be described. First, when the shaft body retaining portion 30 of the handle main body 2 is pressed on the tip end of the shaft body 5, the locking portion 42 of the linking clip 4 is pressed outward, and the pair of elastic legs 41 are elastically deformed toward the outside using the tapered portion 12 of the shaft body 5. Therefore, the gap between the locking portions 42 widens, and it is permissible to pass through the serrated portion 11 of the shaft body 5. When the shaft body 5 enters and the clip fitting groove 13 of the shaft body 5 reaches the locking portion 42, the pair of elastic legs 41 are elastically deformed in the direction of return to the original shape, and the locking portion 42 enters the clip fitting groove 13. Thereby, the locking portion 42 locks the clip locking portion 14, and the handle main body 2 prevented from coming off and linked to the shaft body 5.

According to the process described above, mounting of the linking clip 4 on the handle main body 2 is performed, then fitting over the shaft body 5 on the handle main body 2 is performed. In this case, joining is carried out in the radial direction of the shaft body 5 and the shaft body retaining portion 30 by fitting the serrated portion 11 of the shaft body 5 and the serrated groove 32 of the shaft body retaining portion 30. In addition, each elastic leg of the pair of elastic legs 41 is locked to the opening locking portions 33b and 34b on the base portion side and the opening locking portions 33c and 34c on the tip end side of the pair of the clip-holding grooves 33 and 34, and fitting of the linking clip 4 and the shaft body retaining portion 30 is carried out. Additionally, joining of the handle main body 2 and the shaft body 5 in the axial direction is carried out and engagement of the handle main body 2 and the shaft body 5 in the radial direction is carried out by the locking portion 42 of each elastic leg of the pair of elastic legs 41 being fitted into the clip fitting groove 13 of the shaft body 5 and the locking portion 42 locking the clip locking portion 14.

In addition, according to the operation handle and the handle main body structure therefor of the present disclosure, the elastic leg 41 that is inserted into the second clip-holding groove 34 is elastically deformed along in the bent shape from the straight region A1 to the inclined region A2. Abutting force of the second clip-holding groove 34 and the elastic leg 41 is increased since force in the direction of return to the original shape acts on the elastically deformed elastic leg 41. That is, the inclined region A2 that deforms the groove shape in the insertion direction of the linking clip 4 functions as a shape deforming portion that elastically deforms the elastic leg 41 that is inserted into the second clip-holding groove 34 along the groove shape.

It is possible to suppress generation of looseness of the linking clip 4 in the clip-holding grooves 33 and since abutting force of the linking clip 4 and the clip-holding grooves 33 and 34 of the shaft body retaining portion 30 increases. Therefore, it is possible to suppress movement of the handle main body 2 in the axial direction and it is possible to eliminate a problem of an abnormal sound being generated by vibration and the like of the shaft body 5.

In addition, according to the operation handle and the handle main body structure therefor of the present disclosure, it is possible to easily insert the linking clip 4 into the clip-holding grooves 33 and 34 since it is not necessary to use the linking clip in which the shape is deformed in advance. Therefore, in assembly work of the linking clip 4, it is possible to automatically use a manufacturing apparatus. However, when the tip end side of the elastic leg 41 (second inclination portion 41b) enters the inclined region A2, the abutting force of the second clip-holding groove 34 and the elastic leg 41 increases, but only pushing force is required to the degree to overcome the abutting force in the manufacturing apparatus, and it is possible to realize automation of assembly work without complicated work for positional alignment with high precision.

Furthermore, in a case where the shape of the linking clip is deformed in a bending process, it is necessary to stringently evaluate process precision of the linking clip considering insertion into the clip-holding groove. However, according to the present embodiment, shape management of the linking clip 4 is unnecessary, and it is possible to achieve an improvement of manufacturability. Meanwhile, it is necessary to manage the shape of the clip-holding grooves 33 and 34, but it is possible to form the clip-holding groove 34 with good precision using a molding method, and it is possible to easily perform shape management.

In addition, versatility is lost when a unique shape is adopted in the linking clip since the linking clip is a component that it is possible to universally use in many other components. Thereby, it is necessary to design the linking clip as an exclusive component, common use of the component is hindered, and there is a possibility for costs to be caused to increase. However, according to the present embodiment, it is possible to eliminate such a problem since it is not necessary to adopt a unique shape that applies torsion to the linking clip 4.

In addition, according to the operation handle and the handle main body structure therefor of the present disclosure, the second clip-holding groove 34 may be constituted by a straight region A1 that is formed in a straight line shape referencing the insertion direction of the linking clip 4 and an inclined region A2 that is linked to the straight region A1 and inclined according to the straight region A1.

According to the configuration, it is possible for the inclined region A2 that is bent from the straight region A1 to function as the shape deforming portion since the second clip-holding groove 34 adopts a bent shape from the straight region A1 to the inclined region A2. Thereby, it is possible to exhibit the effect described above.

In addition, according to the operation handle and the handle main body structure therefor of the present disclosure, the second clip-holding groove 34 may be constituted by the straight region A1 on the front side in the insertion direction of the linking clip 4 and may be constituted by the inclined region A2 on the back side in the insertion direction of the linking clip 4.

In a case where inclination to the front side in the insertion direction of the linking clip 4 is configured, insertion of the linking clip 4 is hindered, and it is difficult to automate assembly work of the linking clip 4. In that point, according to the present embodiment, it is possible to easily perform insertion of the linking clip 4 since the straight region A1 is configured on the front side in the insertion direction of the linking clip 4. Thereby, in assembly work of the linking clip 4, it is possible to automatically use the manufacturing apparatus.

In addition, according to the operation handle and the handle main body structure therefor of the present disclosure, the shape deforming portion is formed in the second clip-holding groove 34 out of the pair of the clip-holding grooves 33 and 34. Then, the first clip-holding groove 33 may be formed in a straight line shape in which a groove shape is uniform according to the insertion direction of the linking clip 4.

It is also possible for the shape deforming portion to respectively set the pair of the clip-holding grooves 33 and 34, but in this case, a large abutting force is generated in the individual clip-holding grooves 33 and 34. Therefore, when the linking clip 4 is inserted into the pair of the clip-holding grooves 33 and 34, a large pressing force is necessary, and workability may be worsened. However, as shown in the present embodiment, it is possible to easily perform insertion of the linking clip 4 without excessive pressing force being necessary by setting the shape deforming portion in only the second clip-holding groove 34.

The operation handle and the handle main body structure therefor of the present disclosure are described above, but the present disclosure is not limited to the embodiment described above, and needless to say various modifications are possible in the scope of the invention. In addition, the handle main body structure that constitutes the operation handle also functions as a part of the present invention. Furthermore, the operation handle of the present invention is able to be widely applied as the operation handle that is a handle for operating the shaft body such as a regulator handle other than the inside handle of the sliding door.

REFERENCE SIGNS LIST

1 OPERATION HANDLE
2 HANDLE MAIN BODY
20 MAIN BODY PORTION
30 SHAFT BODY RETAINING PORTION
31 INNER PERIPHERAL WALL
32 SERRATED GROOVE
33 FIRST CLIP-HOLDING GROOVE
34 SECOND CLIP-HOLDING GROOVE
A1 STRAIGHT REGION
A2 INCLINED REGION
4 LINKING CLIP
40 BASE PORTION
41 ELASTIC LEG
41*a* FIRST INCLINATION PORTION
41*b* SECOND INCLINATION PORTION
42 LOCKING PORTION
5 SHAFT BODY
11 SERRATED PORTION
12 TAPERED PORTION
13 CLIP FITTING GROOVE
14 CLIP LOCKING PORTION

What is claimed is:

1. An operation handle which is linked to a shaft body and which is configured to operate the shaft body, the operation handle comprising:
a handle main body; and
a linking clip,
wherein the handle main body includes a cylindrical shape shaft body retaining portion fitted over the shaft body,
wherein the shaft body retaining portion includes a pair of clip-holding grooves,
wherein the linking clip includes a base portion and a pair of elastic legs which face each other via the base portion,
wherein each of the pair of elastic legs includes a locking portion,
wherein the pair of elastic legs are inserted into the pair of the clip-holding grooves and the shaft body retaining portion is interposed from both sides by the pair of elastic legs and the linking clip is mounted in the shaft body retaining portion,
wherein each of the locking portions extends further inside than an inner peripheral wall of the shaft body retaining portion,
wherein at least one of the pair of the clip-holding grooves includes a shape deforming portion which has a groove shape deformed from an insertion direction of the linking clip and which elastically deforms the elastic legs inserted into the clip-holding grooves along the groove shape, and
wherein one of the pair of the clip-holding grooves includes a straight region which is formed in a straight line shape based on the insertion direction of the linking clip and an inclined region which is continuous to the straight region and is inclined relative to the straight region.

2. The operation handle according to claim 1,
wherein in one of the pair of the clip-holding grooves, the straight region is positioned in a front side in the insertion direction of the linking clip, and the inclined region is positioned in a back side in the insertion direction of the linking clip.

3. The operation handle according to claim 1,
wherein one of the pair of the clip-holding grooves includes the shape deforming portion, and
wherein the other of the pair of the clip-holding grooves is formed in a straight line shape in which a groove shape is uniform according to the insertion direction of the linking clip.

4. A handle main body of an operation handle which is linked to a shaft body via a linking clip which includes a pair of elastic legs which face each other via a base portion, the handle main body comprising:
a main body portion; and
a cylindrical shape shaft body retaining portion fitted over the shaft body,
wherein the shaft body retaining portion has a pair of clip-holding grooves formed on the outer peripheral surface of the shaft body retaining portion,
wherein when the pair of elastic legs are inserted into the pair of the clip-holding grooves, the shaft body retaining portion is configured that the shaft body retaining portion is interposed from both sides by the pair of elastic legs and that the linking clip is mounted in the shaft body retaining portion,
wherein the shaft body retaining portion is configured that a locking portion of the pair of elastic legs extends further inside than an inner peripheral wall of the shaft body retaining portion, and
wherein at least one of the pair of the clip-holding grooves includes a shape deforming portion which deforms the groove shape according to an insertion direction of the linking clip and elastically deforms the elastic legs inserted into the clip-holding grooves along the groove shape, and
wherein one of the pair of the clip-holding grooves includes a straight region which is formed in a straight line shape based on the insertion direction of the linking clip and an inclined region which is continuous to the straight region and is inclined relative to the straight region.

5. An operation handle which is linked to a shaft body and which is configured to operate the shaft body, the operation handle comprising:
a handle main body; and
a linking clip,
wherein the handle main body includes a cylindrical shape shaft body retaining portion fitted over the shaft body,
wherein the shaft body retaining portion includes a pair of clip-holding grooves,
wherein the linking clip includes a base portion and a pair of elastic legs which face each other via the base portion,
wherein each of the pair of elastic legs includes a locking portion, wherein the pair of elastic legs are inserted into the pair of the clip-holding grooves and the shaft body retaining portion is interposed from both sides by the pair of elastic legs and the linking clip is mounted in the shaft body retaining portion, wherein each of the locking portions extends further inside than an inner peripheral wall of the shaft body retaining portion, wherein one of the pair of the clip-holding grooves includes a shape deforming portion which has a groove shape deformed from an insertion direction of the linking clip and which elastically deforms the elastic legs inserted into the clip-holding grooves along the groove shape, and wherein the other of the pair of the clip-holding grooves is formed in a straight line shape in which a groove shape is uniform according to the insertion direction of the linking clip.

* * * * *